3,810,854
PROCESS FOR MANUFACTURING INITIAL AMINOPLAST CONDENSATES

Kazuo Doi, Osaka, and Yoshihiro Kitsuda, Higashi Osaka, Japan, assignors to British Industrial Plastics Limited, Manchester, England
No Drawing. Filed Aug. 4, 1972, Ser. No. 278,022
Claims priority, application Japan, Aug. 5, 1971, 46/59,169
Int. Cl. C08g 9/10
U.S. Cl. 260—21     9 Claims

ABSTRACT OF THE DISCLOSURE

A thermosetting aminoplast resin material is manufactured by effecting thermal mixing of urea or thiourea, paraformaldehyde and hexamethylene tetramine in a molar ratio within the range from 1:1.0:0.01 to 1:25:0.2 respectively, in the absence of a solvent, to produce a condensate which, when solid, is amorphous and has a softening point of less than 100° C. This material can be compounded with a filler and hardener and optionally with other moulding material components and the resulting compound granulated in a granular extrusion kneader to form a thermosetting aminoplast moulding composition.

---

This invention relates to a method of manufacturing a thermosetting aminoplast resin and of manufacturing a moulding material therefrom.

Conventional initial aminoplast condensates, such as monomethylolurea (decomposition temperature 108° C.) and dimethylolurea (M.P. 128° C.) are highly crystalline, have a high melting point or decomposition temperature and are made into thermosetting aminoplast moulding materials by dry processing techniques only with extreme difficulty. The technique consists of compounding a mixture of aminoplast resin, filler, hardener and other components and requires that the mixture be heated to a temperature sufficiently high to soften the resin. In the case of the conventional initial condensates referred to above, the softening points are very high and are close to the moulding temperature. Moulding materials produced from these resins can therefore only be granulated by thermal compression for very short periods of time under a narrow range of conditions; furthermore, they lack stability due to the hardening and decomposition of the resin during heating.

An object of the present invention is to obviate or mitigate the disadvantages mentioned above.

We have found that initial aminoplast condensates having low softening points may be manufactured from urea or thiourea, paraformaldehyde and hexamethylene tetramine, if the molar ratios thereof are selected from within certain specific limits and if certain conditions are adhered to during the process of manufacturing the initial aminoplast condensate, and that such condensates can be granulated satisfactorily to form granular moulding materials.

According to the present invention there is provided a process for manufacturing an initial aminoplast condensate, comprising effecting thermal mixing, in the absence of a solvent, of urea or thiourea, paraformaldehyde and hexamethylene tetramine, if the molar ratios thereof are selected from within certain specific limits and if certain conditions are adhered to during the process of manufacturing the initial aminoplast condensate, and that such condensates can be granulated satisfactorily to form granular moulding materials.

According to the present invention there is provided a process for manufacturing an initial aminoplast condensate, comprising effecting thermal mixing, in the absence of a solvent, of urea or thiourea, paraformaldehyde and hexamethylene tetramine in a molar ratio within the range from 1:1.1:0.01 to 1:25:0.2, respectively, and dehydrating the resultant mixture to produce a product which, when solid, is amorphous and has a softening point of less than 100° C.

The step of dehydrating the resultant mixture, in one preferred aspect of the invention, is effected under reduced pressure, preferably within the range from 10 to 60 mm. of mercury.

The thermal mixing preferably is effected at a temperature within the range from 50° to 90° C., more preferably from 70° to 90° C., and preferably the temperature is maintained within this range until the absorption of free formaldehyde ceases. Prior to dehydrating the mixture under reduced pressure, it is preferred to cool the mixture once to a temperature below 30° C. and thereafter raise the temperature to about 95° C.

The present invention also provides a method of manufacturing a granular aminoplast moulding material, comprising the steps of mixing together (i) an initial aminoplast condensate component, manufactured by the process aforesaid, in powdered amorphous solid form,
(ii) a filler component, and
(iii) a hardener component;

charging the resultant mixture into a heated granulating extrusion kneader; extruding the heated mixture and granulating the extruded mixture as the latter is formed.

The various steps of the aforesaid method may be effected simultaneously.

Preferably the components (i), (ii) and (iii) are mixed in a weight ratio of from 70:20:0.01 to 70:40:0.02 respectively. From 0.1 to 0.4 parts of a metal stearate or other mould release agent per 70 parts of component (i) may be added, and a colorant and/or a plasticizer may be added as desired.

A preferred mode of carrying the present invention into practice, in both aspects as defined above, comprises preparing a mixture of 1 part urea or thiourea, from 1.1 to 25 parts of paraformaldehyde and 0.01 to 0.2 part, preferably 0.02 to 0.1 part, of hexamethylene tetramine, and melting the mixture at a temperature within the range from 70 to 95° C. in the absence of solvent. The mixture is maintained within this temperature range until free formaldehyde absorption is complete, then it is cooled to below 50° C. and the temperature then raised to 95° C. under reduced pressure to dehydrate the resin, and thereby obtain a material which, when cooled and solidified is amorphous and has a softening point of from 60 to 100° C. It may then be desirable to add hexamethylene tetramine, since less than 1% thereof with respect to the urea or thiourea results in poor gelation, although the use of more than 20% deteriorates the moulding characteristics. 70 parts by weight of a powder which is prepared by crushing the amorphous, solid initial aminoplast condensate is added to 20 to 40 parts of a filler selected from powdered pulp, α-cellulose, wood flour, and mineral and glass fibre, 0.01 to 0.02 part of a hardener comprising one or more of ammonium chloride, p-toluene-sulphonic acid triethylamine salt, sulfanilic acid triethylamine salt, phthalic anhydride, benzoic acid and p-toluene sulphonic acid, together with from 0.1 to 0.4 part of metal stearate soap, such as zinc stearate, cadmium stearate or lead stearate, as a mould-release agent and a suitable amount of a colorant (i.e. a pigment or dye). This is followed by mixing in a mixer, and the mixture is charged into an extrusion kneader and extruded therefrom while being heated to 70° to 100° C. Whilst this thermal kneading proceeds, the resin becomes fluid and penetrates into the filler, hardener, colorant, plasticizer, etc. and a satisfactory dispersion is obtained. A granular aminoplast moulding material is obtained by cutting to suitable size the lumpy material extruded from the extrusion kneader.

Being free from the conventional requirement of thermally melting crystals, the present invention enables low-temperatures (less than 100° C.) kneading to be performed, at which temperature the initial aminoplast condensate flows without hardening, even in the presence of hardener, and a resin having high thermal stability is obtained. By virtue of the increased stability to the extrusion and thermal kneading of the resin, it is now possible to manufacture an aminoplast moulding material by a dry process in which dispersion of the hardener, kneading of the filler, dispersion of mould-release agent, colorant, etc. and granulation, are simultaneously performed. It is thus possible to manufacture a granular aminoplast moulding material directly, without effecting such processes as crushing and colouring in a ball-mill which are currently considered to be essential for obtaining optimum penetration and impregnation of the resin to the filler, and for ageing. Crushing and colouring in a ball-mill, in particular, has low efficiency and requires much labour and expense, but can now be obviated.

Hitherto, long-fibred fillers, when crushed with resin during the ball-mill process, lost their long-fibre reinforcing effect, but by the method of this invention it is possible to use long-fibre fillers, such as pulp, cotton cloth cutting and synthetic fibres, without crushing. This leads to moulding materials made by this method having high impact and other mechanical strengths.

The following examples are given to illustrate preferred embodiments of the present invention, parts and percentages being by weight unless otherwise specified.

EXAMPLE 1

A mixture of 110 parts of commercially pure urea, 95 parts of paraformaldehyde (85% pure) and 5 parts of hexamethylene tetramine was placed in a pear-shaped reactor and agitated for 60 minutes at 90° C. The mixture was then cooled to 50° C. and dehydrated for 3 hours with gradual heating under a reduced pressure of 20 mm. Hg to yield, when cooled, 210 parts of a solid initial condensate. It was ascertained that this solid initial condensate was amorphous from X-ray diffraction intensity. Its water-insoluble fraction was 17% and its melting temperature over a hot plate was 71° C.

EXAMPLE 2

750 parts of the initial condensate which was obtained in Example 1 was crushed and 400 parts of wood flour, 1.5 parts of phthalic anhydride, 1 part of each of cadmium stearate and zinc stearate were added, together with 20 parts of titanium white as a pigment, and the total mass was charged into the hopper of a small Buss Ko kneader having three heating zones. The heating temperatures of the kneader proper were set in the sequence of 70° C., 80° C. and 90° C. downstream from the hopper and of the kneader. The entire quantity of moulding material was extruded during 30 minutes and a granular moulding material was delivered from the end of the kneader downstream from the hopper.

EXAMPLE 3

A mixture of 110 parts of commercially pure urea, 90 parts of paraformaldehyde powder (98% pure) and 10 parts of hexamethylene tetramine was placed in a three-necked reactor an agitated for 90 minutes at 90° C. The mixture was then dehydrated while being heated under a reduced pressure of 50 mm. Hg to give an initial condensate. This was found, when cooled, to be amorphous, on carrying out X-ray diffraction. Its softening point observed on a hot plate was 78° C. 70 parts of this solid initial condensate were crushed in a mortar and homogeneously mixed with 33 parts of pulp powder, 0.1 part of ammonium chloride hardener, 0.1 part of nigrosine pigment and 0.28 part of zinc stearate and charged into the hopper of a Brabender extrusion kneader. The heating temperature of the kneader was set in a sequence of 73° C., 85° C. and 88° C. from the hopper end, and a granulated moulding material was obtained from the other end of the kneader, operated at a speed of 30 r.p.m.

The properties of the moulding materials obtained in these examples were as follows:

| | |
|---|---|
| Apparent density _____g./cc__ | 0.6 to 0.8 |
| Specific gravity of moulding _____ | 1.45 |
| Moisture content _____percent__ | 3.5 to 5.0 |
| Mould shrinkage _____percent__ | 0.5 to 0.6 |
| Bending strength _____kg./mm.$^2$__ | 8 to 12 |
| Impact strength _____kg. cm./cm.$^2$__ | 2 to 3 |
| Insulation resistance _____MΩ__ | $10^5$ |
| Insulation resistance after boiling _____MΩ__ | 2 to 8 |
| Withstand voltage _____kv./mm__ | 10 to 12 |
| Arc resistance _____sec__ | 60 to 80 |
| Heat resistance _____ | 1 |

[1] No change for 2 hours at 105° C.

EXAMPLE 4

A mixture of 76 parts (1 mole) of commercial thiourea, 62 parts (2 moles) of 98% pure paraformaldehyde and 4 parts of hexamethylene tetramine was placed in a pear-shaped reactor and agitated for 3 hours at 80° C. The mixture obtained was dehydrated slowly under a reduced pressure of 30 mm. Hg to yield a solid initial condensate 3 hours afterwards. Its softening temperature observed on a hot plate was 90° C. By crushing 750 parts of this initial condensate and blending and extruding under the conditions given in Example 2, a granular moulding material was obtained, having properties similar to those listed above.

What is claimed is:

1. A process for manufacturing an initial aminoplast condensate comprising providing a mixture consisting of urea or thiurea, paraformaldehyde and hexamethylene tetramine substantially free from a solvent and wherein the molar ratio of urea or thiourea to paraformaldehyde and hexamethylene tetramine is within the range of from 1:1.1:0.01 to 1:25:0.2, respectively; agitating said mixture at a temperature within the range of from 50 to 90° C.; and dehydrating the resultant mixture at a pressure within the range from 10 to 60 mm. of mercury to produce a condensate which, when solid, is amorphous and has a softening point of less than 100° C.

2. A process according to claim 1, wherein the temperature is maintained within the range specified therein until absorption of free formaldehyde ceases.

3. The product of a process according to claim 1.

4. A process for manufacturing an initial aminoplast condensate, characterized by effecting mixing, at a temperature within the range from 50° to 90° C. and in the absence of a solvent, of a mixture of urea or thiourea, paraformaldehyde and hexamethylene tetramine in a molar ratio within the range from 1:1.1:0.01 to 1:25:0.2, respectively; cooling the resultant mixture once to a temperature below 50° C. and thereafter reheating the cooled mixture to about 95° C.; and dehydrating the reheated mixture under a pressure between 10 and 60 mm. of mercury to produce a condensate which, when solid, is amorphous and has a softening point within the range from 60° to 100° C.

5. A process according to claim 4, wherein the molar ratio of the urea or thiourea to the hexamethylene tetramine is within the range from 1:0.02 to 1:0.1.

6. The product of a process according to claim 4.

7. A method of manufacturing a granular aminoplast moulding material, comprising the steps of:
(A) first forming an initial aminoplast condensate (i) in a powder form by:
(1) mixing together a mixture consisting essentially of urea or thiourea, paraformaldehyde and hexamethylene tetramine substantially free from a solvent, the molar ratio of urea to thiourea, paraformaldehyde and hexamethylene tetramine is within the range of from 1:1.1:0.01 to 1:25:0.2, respectively; agitating the mixture at a temperature within the range of from 50 to 90° C.; dehydrating the resultant mixture at a pressure within the range of from 10 to 60 mm. of mercury to produce a condensate which, when solid, is amorphous and has a softening point less than 100° C., or
(2) mixing together at a temperature in the range of from 50° to 90° C. and in the absence of a solvent, urea or thiourea, formaldehyde and hexamethylene tetramine in a molar ratio within the range of from 1:1.1:0.01 to 1:25:0.2, respectively; cooling the resulting mixture once to a temperature below 50° C. and thereafter reheating the cooled mixture to about 95° C.; and thereafter dehydrating the reheated mixture under a reduced pressure to produce a condensate which, when solid, is amorphous and has a softening point within the range of from 60° to 100° C.;
(B) mixing the powdered initial aminoplast condensate component (i) of step (A) with (ii) a filler component and (iii) a hardener component for catalyzing cure of the condensate;
(C) charging the mixture of step (B) into an extrusion kneader heated to less than about 100° C.;
(D) kneading the mixture and extruding the thus kneaded mixture to form an extrudate while, at the same time, granulating the extrudate simultaneously as it is extruded.

8. A method according to claim 7, characterized by mixing the components (i), (ii) and (iii) in a weight ratio of from 70:20:0.01 to 70:40:0.02, respectively.

9. A method according to claim 7, characterized by adding to the components (i), (ii) and (iii) a mould-release agent comprising from 0.1 to 0.4 part by weight of a metal stearate per 70 parts of component (i).

References Cited
UNITED STATES PATENTS

| | | | |
|---|---|---|---|
| 2,030,192 | 2/1936 | Watson | 260—69 R |
| 2,133,689 | 10/1938 | Ellis | 260—69 R |
| 1,458,543 | 6/1923 | Pollak | 260—69 R |
| 1,737,918 | 12/1929 | Cherry | 260—69 R |
| 1,926,786 | 9/1933 | Novotny et al. | 260—69 F |
| 1,991,810 | 2/1935 | Lilienfeld | 260—69 R |
| 2,029,836 | 2/1936 | Ripper | 260—69 F |
| 2,033,718 | 3/1936 | Kraus | 260—69 R |

FOREIGN PATENTS

| | | | |
|---|---|---|---|
| 429,346 | 5/1935 | Great Britain | 260—69 F |
| 331,428 | 7/1930 | Great Britain | 260—69 F |

DONALD E. CZAJA, Primary Examiner

R. W. GRIFFIN, Assistant Examiner

U.S. Cl. X.R.

260—17.3 R, 69 R, 69 F